US008914776B2

(12) United States Patent
Rice et al.

(10) Patent No.: US 8,914,776 B2
(45) Date of Patent: Dec. 16, 2014

(54) ASSISTING DEVELOPMENT TOOLS THROUGH INSERTED CODE STATEMENTS

(75) Inventors: Timothy S. Rice, Seattle, WA (US); Akrosh Gandhi, Redmond, WA (US); Tae Hyung Kim, Redmond, WA (US); Gregory Bernard Miskelly, Seattle, WA (US); Michael C. Fanning, Redmond, WA (US); Andrew R. Sterland, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 94 days.

(21) Appl. No.: 13/473,614

(22) Filed: May 17, 2012

(65) Prior Publication Data

US 2013/0311973 A1 Nov. 21, 2013

(51) Int. Cl.
*G06F 9/44* (2006.01)

(52) U.S. Cl.
USPC ............................ 717/124; 717/125; 717/129

(58) Field of Classification Search
None
See application file for complete search history.

(56) References Cited

U.S. PATENT DOCUMENTS

| | | | |
|---|---|---|---|
| 6,164,841 A | 12/2000 | Mattson, Jr. et al. | |
| 6,353,923 B1 | 3/2002 | Bogle et al. | |
| 7,036,045 B2 * | 4/2006 | Broussard et al. | 717/124 |
| 7,596,780 B2 * | 9/2009 | Selitrennikoff et al. | 717/124 |
| 7,647,586 B2 * | 1/2010 | Long et al. | 717/129 |
| 8,196,104 B2 * | 6/2012 | Cohrs et al. | 717/125 |
| 8,468,499 B2 * | 6/2013 | Dhurjati et al. | 717/125 |
| 8,688,910 B2 * | 4/2014 | Moyer | 717/124 |
| 8,756,577 B2 * | 6/2014 | Bates | 717/125 |
| 2002/0108102 A1 * | 8/2002 | Muhlestein et al. | 717/124 |
| 2004/0205720 A1 | 10/2004 | Hundt | |
| 2004/0205725 A1 * | 10/2004 | Lambert | 717/124 |
| 2005/0132338 A1 * | 6/2005 | Kalra | 717/129 |
| 2005/0187930 A1 | 8/2005 | Subramanian et al. | |
| 2006/0101407 A1 * | 5/2006 | Massarenti et al. | 717/125 |
| 2006/0101411 A1 * | 5/2006 | Selitrennikoff et al. | 717/127 |
| 2007/0124334 A1 | 5/2007 | Pepin | |
| 2007/0282889 A1 | 12/2007 | Ruan et al. | |
| 2008/0244243 A1 * | 10/2008 | Kalra | 712/225 |

(Continued)

FOREIGN PATENT DOCUMENTS

EP 1400897 A2 3/2004

OTHER PUBLICATIONS

Corliss et al., "Low-Overhead Interactive Debugging via Dynamic Instrumentation with DISE", 2005 IEEE, HPCA-11 Feb. 12-16, 2005, pp. 1-12; <http://ieeexplore.ieee.org/xpls/abs_all.jsp?arnumber=1385953>.*

(Continued)

*Primary Examiner* — Thuy Dao
*Assistant Examiner* — Ben C Wang
(74) *Attorney, Agent, or Firm* — Kevin Sullivan; Katherine Drakos; Micky Minhas

(57) ABSTRACT

Aspects of the subject matter described herein relate to assisting development tools. In aspects, statements that influence runtime behavior may be inserted into code of a program. For example, a statement inserted into a function may set a property of a runtime object to indicate that a debugger is to be notified for exceptions that are encountered within the scope of the function. When a runtime environment encounters an exception, the runtime environment may determine whether the property applies to the currently-executing scope. If so, the runtime environment may notify or not notify a development tool of the exception based on the value of the property.

16 Claims, 5 Drawing Sheets

(56) References Cited

U.S. PATENT DOCUMENTS

| | | | |
|---|---|---|---|
| 2008/0270990 A1* | 10/2008 | Kornstaedt | 717/126 |
| 2009/0172231 A1* | 7/2009 | Akaike et al. | 710/267 |
| 2009/0254883 A1 | 10/2009 | Munson et al. | |
| 2010/0077385 A1* | 3/2010 | Flores Assad et al. | 717/129 |
| 2010/0153927 A1 | 6/2010 | Stall et al. | |
| 2010/0153939 A1* | 6/2010 | Stall et al. | 717/158 |
| 2010/0235810 A1 | 9/2010 | Campbell et al. | |
| 2010/0269091 A1* | 10/2010 | Barnes et al. | 717/106 |
| 2010/0287414 A1* | 11/2010 | Pardoe et al. | 714/38 |
| 2011/0138361 A1 | 6/2011 | McEntee et al. | |
| 2011/0145800 A1* | 6/2011 | Rao et al. | 717/133 |
| 2011/0296375 A1 | 12/2011 | Mooney | |
| 2011/0321017 A1* | 12/2011 | Kapoor et al. | 717/129 |
| 2012/0102466 A1* | 4/2012 | Bates | 717/124 |
| 2012/0272217 A1* | 10/2012 | Bates | 717/124 |
| 2013/0007716 A1* | 1/2013 | Bates | 717/124 |
| 2013/0145136 A1* | 6/2013 | Duffy | 712/244 |

OTHER PUBLICATIONS

Zhang et al., "BPGen: An Automated Breakpoint Generator for Debugging", 2010 ACM, ICSE'10, May 2-8, 2010, Cape Town, South Africa, pp. 271-274; <http://dl.acm.org/results.cfm?h=1&cfid=400009053&cftoken=90567657>.*

Walter Rudametkin, "Dynamic Instrumentation for Application Management and Application Analysis in Component-based Application", Sep. 6, 2007, Joseph Fourier University, France, pp. 1-67; <http://rudametw.github.io/docs/MasterThesis-WalterRudametkin-FINAL.pdf>.*

Gioachin, et al., "Dynamic High-Level Scripting in Parallel Applications", Retrieved at <<http://ieeexplore.ieee.org/stamp/stamp.jsp?tp=&arnumber=5161040>>, Proceedings of IPDPS 2009. IEEE International Symposium on Parallel & Distributed Processing, 2009, May 23, 2009, pp. 11.

"Injecting Code Dynamically with the Debugging API", Retrieved at <<http://msdn.microsoft.com/en-us/library/bb384380(v=vs.110).aspx>>, Retrieved Date Apr. 10, 2012, pp. 5.

"International Search Report & Written Opinion for PCT Patent Application No. PCT/US2013/055897", Mailed Date: Dec. 2, 2013, Filed Date: Aug. 21, 2013, 10 Pages.

"International Search Report & Written Opinion for PCT Patent Application No. PCT/US2013/055218", Mailed Date: Dec. 5, 2013, Filed Date: Aug. 15, 2013, 12 Pages.

* cited by examiner

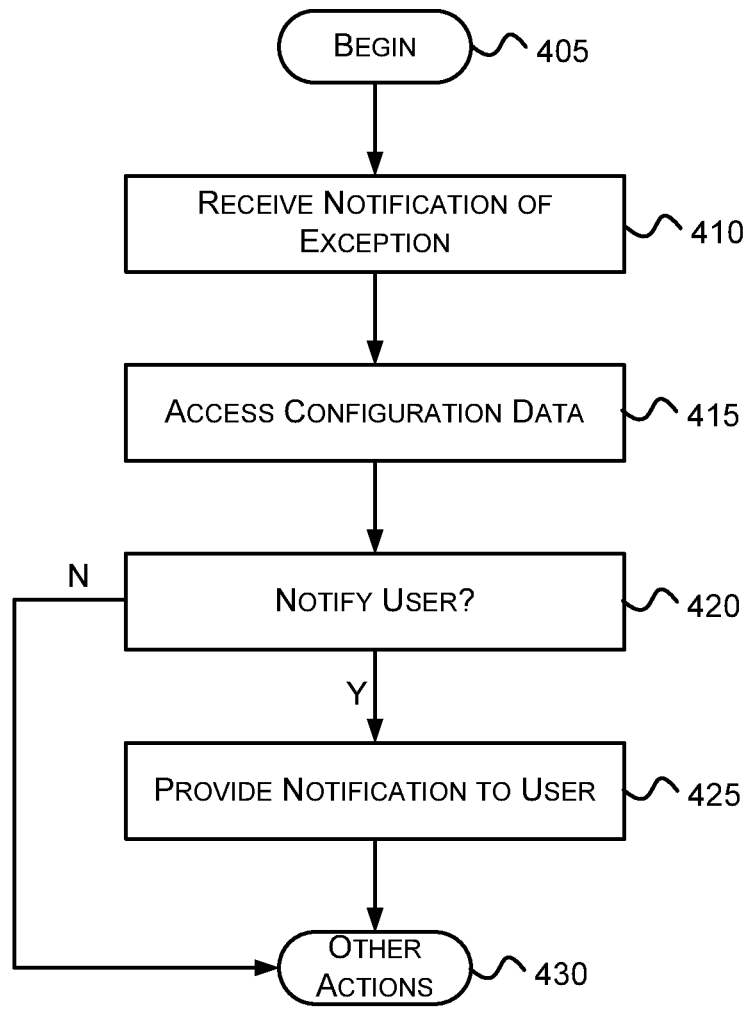

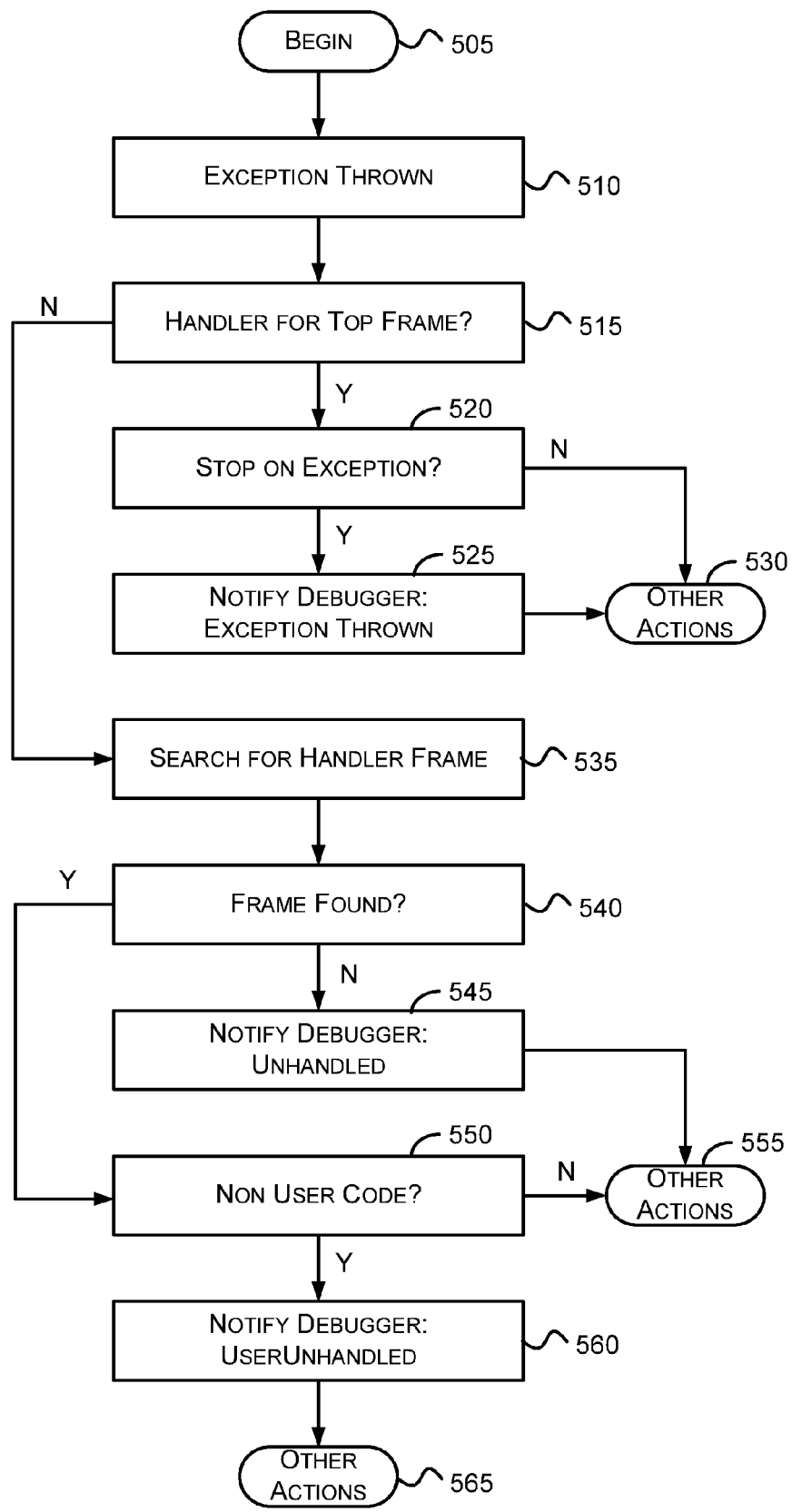

ASSISTING DEVELOPMENT TOOLS THROUGH INSERTED CODE STATEMENTS

BACKGROUND

When debugging software at runtime, it is often desirable to distinguish code for which the software developer is not directly responsible. For example, a software developer may not want the debugger to be activated when an exception is encountered in library code. Some non-dynamic languages attempt to address this through the use of compile-time attributes that are available at compile time. Dynamic languages, however, do not have this capability.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Briefly, aspects of the subject matter described herein relate to assisting development tools. In aspects, statements that influence runtime behavior may be inserted into code of a program. For example, a statement inserted into a function may set a property of a runtime object to indicate that a debugger is to be notified for exceptions that are encountered within the scope of the function. When a runtime environment encounters an exception, the runtime environment may determine whether the property applies to the currently-executing scope. If so, the runtime environment may notify or not notify a development tool of the exception based on the value of the property.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements.

BRIEF DESCRIPTION OF THE DRAWINGS

FIG. 4 is a flow diagram that generally represents exemplary actions that may occur from a development tool's perspective in accordance with aspects of the subject matter described herein; and FIG. 5 is a flow diagram that generally represents exemplary actions that may occur when an exception occurs in accordance with aspects of the subject matter described herein.

DETAILED DESCRIPTION

Definitions

As used herein, the term "includes" and its variants are to be read as open-ended terms that mean "includes, but is not limited to." The term "or" is to be read as "and/or" unless the context clearly dictates otherwise. The term "based on" is to be read as "based at least in part on." The terms "one embodiment" and "an embodiment" are to be read as "at least one embodiment." The term "another embodiment" is to be read as "at least one other embodiment."

As used herein, terms such as "a," "an," and "the" are inclusive of one or more of the indicated item or action. In particular, in the claims a reference to an item generally means at least one such item is present and a reference to an action means at least one instance of the action is performed.

Sometimes herein the terms "first", "second", "third" and so forth may be used. Without additional context, the use of these terms in the claims is not intended to imply an ordering but is rather used for identification purposes. For example, the phrases "first version" and "second version" do not necessarily mean that the first version is the very first version or was created before the second version or even that the first version is requested or operated on before the second version. Rather, these phrases are used to identify different versions.

Computer storage media as used herein includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer. Computer storage media does not include communication media.

Headings are for convenience only; information on a given topic may be found outside the section whose heading indicates that topic.

Other definitions, explicit and implicit, may be included below.

Exemplary Embodiments

Figure 1:
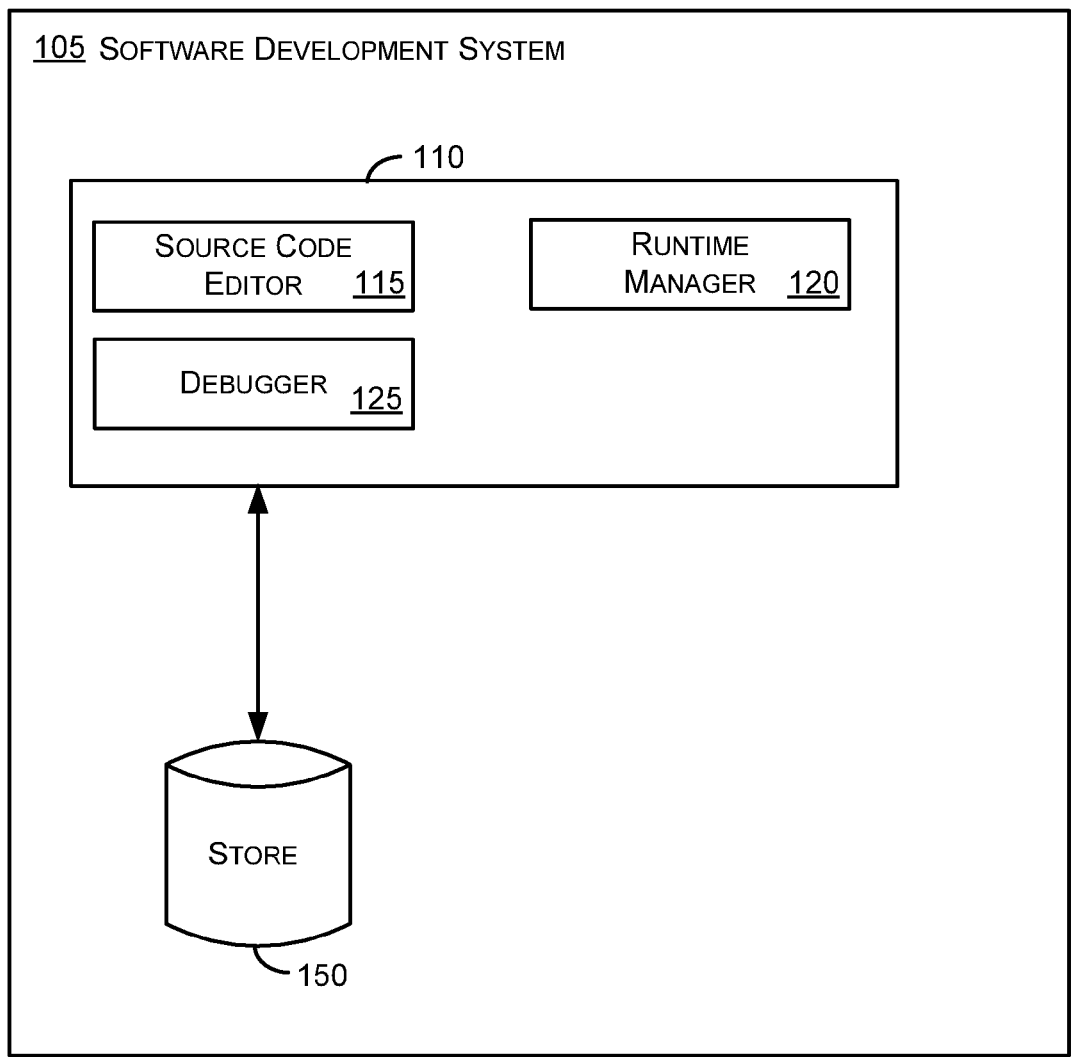
FIGS. 1-2 are block diagrams that represent exemplary environments in which aspects of the subject matter described herein may operate.
Figure 2:
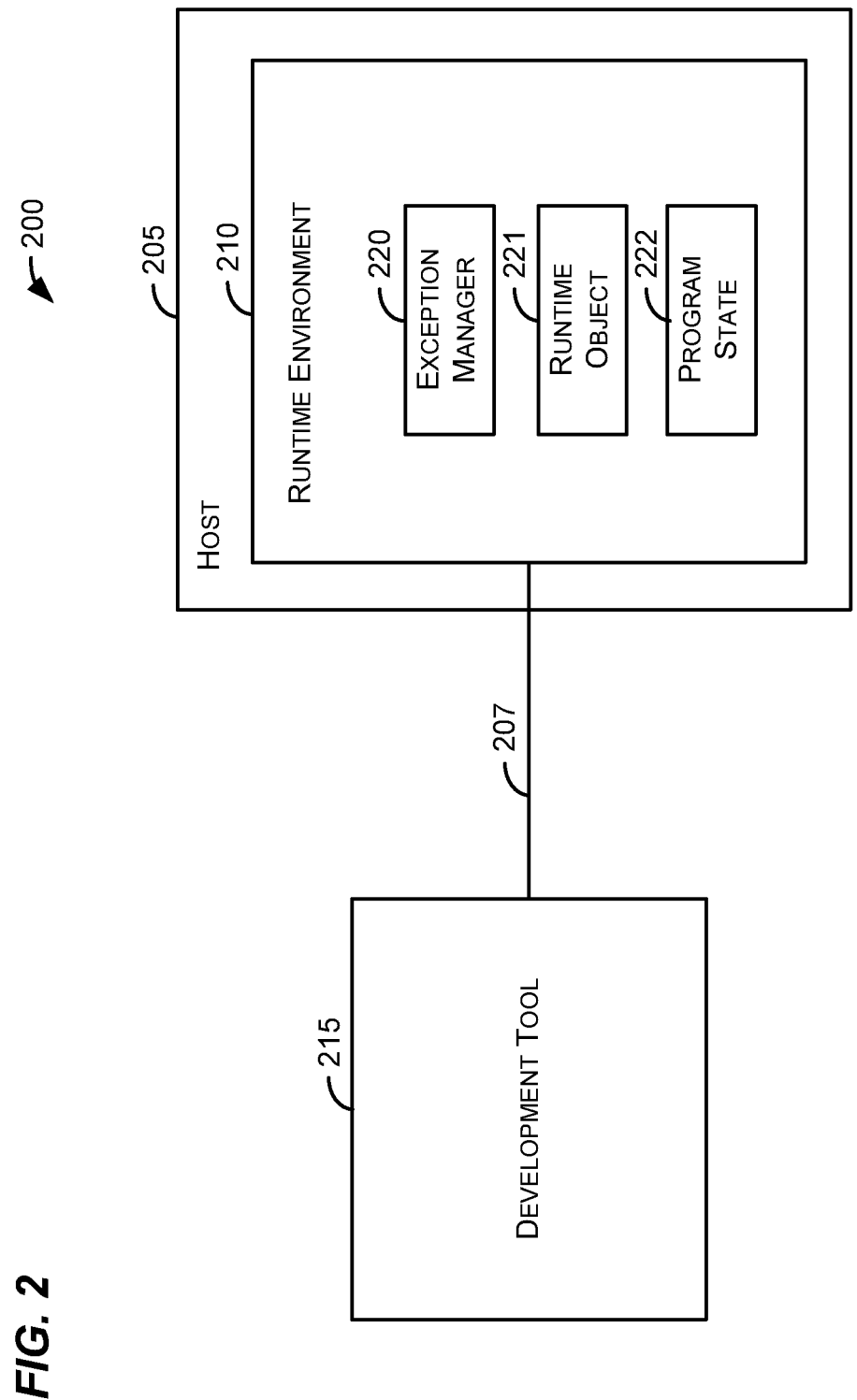

FIGS. 1-2 are block diagrams that represent exemplary environments in which aspects of the subject matter described herein may operate. The components illustrated in FIGS. 1-2 are exemplary and are not meant to be all-inclusive of components that may be needed or included. In other embodiments, the components and/or functions described in conjunction with FIG. 1-2 may be included in other components (shown or not shown) or placed in subcomponents without departing from the spirit or scope of aspects of the subject matter described herein. In some embodiments, one or more of the components described in conjunction with FIG. 1-2 may be distributed across multiple devices that may be located closely together (e.g., on a local network) or spread apart (e.g., in different places on the Internet).

Aspects of the subject matter described herein may be implemented with general purpose or special purpose computing system environments or configurations. Examples of computers that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like.

One or more of the components described herein may operate in a virtual environment. A virtual environment is an environment that is simulated or emulated by a computer. The virtual environment may simulate or emulate a physical machine, operating system, set of one or more interfaces, portions of the above, combinations of the above, or the like. When a machine is simulated or emulated, the machine is sometimes called a virtual machine. A virtual machine is a machine that, to software executing on the virtual machine, appears to be a physical machine. The software may save files in a virtual storage device such as virtual hard drive, virtual floppy disk, and the like, may read files from a virtual optical device, may communicate via a virtual network adapter, and so forth.

Turning to FIG. 1, the system 105 may include software development components 110, a store 150, and may include other components (not shown). The software development components may include a source code editor 115, a runtime manager 120, a debugger 125, and other components (not shown). As used herein, the term component is to be read to include all or a portion of one or more devices, a collection of one or more software modules or portions thereof, some combination of one or more software modules or portions thereof and one or more devices or portions thereof, and the like.

The store 150 may include any storage media capable of storing data involved with software development. The term data is to be read broadly to include anything that may be represented by one or more computer storage elements. Logically, data may be represented as a series of 1's and 0's in volatile or non-volatile memory. In computers that have a non-binary storage medium, data may be represented according to the capabilities of the storage medium. Data may be organized into different types of data structures including simple data types such as numbers, letters, and the like, hierarchical, linked, or other related data types, data structures that include multiple other data structures or simple data types, and the like. Some examples of data include information, program code, program state, program data, other data, and the like.

The store 150 may be implemented as a file system, database, volatile memory such as RAM, other storage, some combination of the above, and the like and may be distributed across multiple devices. The store 150 may be external, internal, or include components that are both internal and external to devices that host components of the software development system 105.

In one embodiment, the software development components 110 may be operable to work with a dynamic programming language. In another embodiment, techniques that are described herein may also be applied to non-dynamic programming language environments. A frequently noted difference between dynamic and non-dynamic programming languages is that a non-dynamic language is compiled whereas a dynamic language program is interpreted. In some embodiments, however, this difference is not required.

At runtime, a dynamic programming language environment may perform some actions a non-dynamic programming language environment performs at or before compile time, if at all. For example, during program execution, a dynamic programming language environment may add new code, extend objects and definitions, modify a type system, and the like. Some exemplary dynamic programming languages include ACTIONSCRIPT, BASIC, BEANSHELL, CLOJURE, COLDFUSION, LISP, GROOVY, JAVASCRIPT, VBSCRIPT, PERL, PHP, POWERSHELL, PYTHON, RUBY, SMALLTALK, TEL, and the like. Some non-dynamic programming languages include assembly, C, C++, JAVA, PASCAL, FORTRAN, and others.

The source code editor 115 may allow a software developer to enter, delete, and modify source code of a program. The source code editor 115 may display source code of a program on a display and receive input via the user interface.

The runtime manager 120 may launch a runtime environment to execute source code. In one embodiment, a runtime environment may include a Web browser. In other embodiments, a runtime environment may include one or more components that allow code to be executed outside of a Web browser.

The debugger 125 may interact with a runtime environment to test and debug a program. The debugger 125 may allow a software developer to execute a program step-by-step, pause the program at certain points within the program, view source code, track values of variables and memory locations, modify program state, and the like. In one embodiment, the debugger 125 may allow a software developer to indicate the conditions under which the debugger 125 is notified of exceptions. For example, a software developer may want to be notified of exceptions that are raised in user code but handled in library code but not to be notified of exceptions that are raised in library code and handled in library code.

In another embodiment, for each exception, a notification may be sent to the debugger. Based on the notification and configuration data, however, the debugger may treat the notification differently. For example, in one implementation, if an exception is handled in user code, the exception may be highlighted, bolded, or otherwise displayed more prominently. As another example, if an exception is raised in user code is handled in library code, the notification to the debugger may include this information and this may cause the debugger to stop the program and highlight code associated with the exception. As another example, the notification may be such that the exception is logged to an output window while program execution is allowed to continue. In yet another example, the exception may be logged to a log file and emphasized (e.g., in bold, underline, or otherwise), depending on the notification.

An exception may include data about a condition that occurred during a program's execution. The condition may be such that it needs additional processing or that it may not be resolvable without assistance. For example, a program may encounter a divide by zero condition. As another example, a program may encounter an out-of-memory condition, a missing file, a hard disk error, an invalid argument detected by a function, or some other condition.

As used herein, the phrase "encountering an exception" and its variants may refer to a location where the exception is raised, a location where an exception was handled, or a location where an exception would be handled if execution were allowed to continue. For example, user code may raise an exception that is or would be handled in library code. Similarly, in another example, library code may raise an exception that is or would be handled in user code. Unless the context clearly dictates otherwise, the phrase "encountering an exception" is to be read, in alternate embodiments, to include at least one of the possibilities above.

Although the term debugger is often used herein, the teachings herein may also be applied to other software development tools without departing from the spirit or scope of aspects of the subject matter described herein. Software development tools may include any component used to develop, test, diagnose, or perform other actions with respect to software. Some exemplary software development tools include a debugger, a profiler, a build tool, a text editor, a stack dumper, other development tools, and the like.

There may be many other software development components that are part of the software development system 105 without departing from the spirit or scope of aspects of the subject matter described herein.

The teachings herein may be used, among other things, in debugging dynamic and non-dynamic language programs. For example, a user may want the debugger to be called when an exception is raised in code the user has written and is handled in library code but may not want the debugger to be called when an exception is raised in user code and is handled in the user code. To cause this type of behavior, a library author may insert a statement to inform a runtime environment that it is to notify the debugger when an exception is handled within a scope of the statement. An example of a handler that may be used to handle exceptions that are not handled in user code is illustrated by the following code:

```
function libraryFunction(input) {
    Debug.setNonUserCodeExceptions = true;
    try {
        callsUserCode(input);
    }
    catch (e) { }
}
```

In one embodiment, a scope may refer to the context within a computer program in which a variable name or other identifier is valid and can be used. In another embodiment, a scope may refer to the context in which a declaration has effect. For example, a variable declared in a function may have a scope that exists from the location at which the variable is declared to the end of the function. As another example, a variable declared within a block, may have a scope that exists from the location at which the variable is declared to the end of the block. As another example, a variable that is declared in a file but outside of any functions may have a scope of a file in which the variable is declared. As another example, a variable may be declared that has global scope.

The above scopes are exemplary only. Based on the teachings herein, it will be recognized by those skilled in the art that other scopes may be used without departing from the spirit or scope of aspects of the subject matter described herein.

In dynamic language and non-dynamic languages, a statement may have various scopes depending on where the statement is placed. For example, in a dynamic language such as JAVASCRIPT, a statement may have file scope by placing the statement in an appropriate location of the file. As another example, a statement in a non-dynamic language may also have file scope by placing the statement in an appropriate location. In one example, if a compiler supports the syntax, a statement may be given assembly scope by placing a statement in a static constructor of the assembly.

Sometimes herein, the scope mentioned is that of a function or a block. It is to be understood, however, that in other embodiments, the teachings with respect to a scope of a function or block may be extended to another scope without departing from the spirit or scope of aspects of the subject matter described herein.

To have a statement apply to the scope of a library function, for example, the library author may provide code corresponding to the following pseudocode:

```
Function LibraryFun( ) {
    Debug.setNonUserCodeExceptions = true;
    Statement1;
    . . .
    StatementN;
}
```

In evaluating this code, the runtime may deduce that the currently executing scope is not user code. If an exception is raised in user code and handled in the scope of LibraryFun, the runtime may notify the debugger.

In an embodiment, when the statement setting Debug.setNonUserCodeExceptions=true is encountered, this property may also be applied to any scopes opened within the currently executing scope. The runtime may also notify the debugger for exceptions that are handled within these opened scopes.

In an embodiment, the property Debug.setNonUserCodeExceptions=true is not inherited across function calls. For example, a function that is called from another function that has Debug.setNonUserCodeExceptions=true does not inherit this property. To explicitly cause the runtime to notify the debugger when an exception is handled in a called function, the Debug.setNonUserCodeExceptions=true statement may be placed in the called function.

There may be some conditions in which the debugger is always to be notified. For example, if there is no handler that will handle the exception, the developer may want the debugger to be notified. Determining whether a handler will handle the exception may involve searching one or more stack frames for an appropriate handler. Some exemplary pseudocode that embodies conditions for notifying a debugger is as follows:

```
If (IsHandler for top frame( ))
{
    If (IsStopOnExceptionThrownOptionEnabled( ))
        NotifyDebugger(Exception Thrown);
}
Else
{
    Frame = FindHandlerFrame( )
    If (Frame == null)
        NotifyDebugger(unhandled)
    Elseif (Frame.IsNonUserCode)
        NotifyDebugger(UserUnhandled)
}
```

The above pseudocode indicates actions to determine whether to notify the debugger of an exception. When an exception occurs, a set of checks may be performed. If the exception is encountered in a top stack frame and there is an exception handler for the top stack frame, then if the development environment is configured to stop on exception thrown, the debugger is notified of the exception.

A development environment may be configurable so that a software developer is able to indicate that the debugger is or is not to be notified for exceptions handled in the top frame.

If there is not an exception handler for the top stack frame, then a search is performed for a frame that has a handler. This may be done by searching the stack frames from the top stack frame to the bottom stack frame until an exception handler is found or not found, by consulting a data structure that indicates exception handlers for the stack frames, or through other mechanisms without departing from the spirit or scope of aspects of the subject matter described herein.

If an exception handler is not found in any of the frames, the debugger may be notified that an unhandled exception has been encountered.

If an exception handler is found and the exception handler is not in user code, the debugger may be notified and told that the exception would not be handled by a user exception handler.

Actions corresponding to the actions above are described in more detail in conjunction with FIG. 5.

The statement inserted into code may include a reference to a callback function where the callback function is not called and the value computed until the runtime evaluates program state to make a decision regarding notification. For example, a library author may provide the following pseudocode:

```
Function LibraryFun( ) {
    Debug.setNonUserCodeExceptions = CallBackFunction;
    Statement1;
    ...
    StatementN;
}
```

In one exemplary implementation, this pseudocode may be implemented by the following code that includes a handler:

```
function LibraryFun(input) {
    Debug.setNonUserCodeExceptions = function( ){ return
    global_enableExceptionHandledNotifications};
    try {
        callsUserCode(input);
    }
    catch (e) { }
}
```

When the runtime encounters an exception that is handled in LibraryFun, the runtime may call CallBackFunction to calculate a value used to determine whether to notify the debugger of an exception. The CallBackFunction may use available program state in calculating the value.

When notifying the debugger of an exception, the runtime environment may provide the data associated with the exception to the debugger together with flags that indicate whether the exception was handled in user code, handled in non-user code, or unhandled. In addition, the exception type may also be provided. The debugger may then choose to present information about the exception to a software developer depending on preferences specified in the development environment.

Turning to FIG. 2, the environment 200 may include a host 205, a development tool 215, and other components (not shown). The host 205 may include a runtime environment 210 which may include an exception manager 220, a runtime object 221, and program state 222. The development tool 215 and the runtime environment 210 or any portions thereof may be hosted on different computers or together on a single computer.

In addition, the development tool 215 and the host 205 may reside on the same computer or may reside on different computers. The line 207 represents a communication link between the development tool and the runtime environment 210. The line 207 indicates that the development tool 215 and the runtime environment may be connected (e.g., logically, physically, virtual, or otherwise) via any type of network including a direct connection, a local network, a non-local network, the Internet, some combination of the above, and the like. For example, the line 207 may include one or more local area networks, wide area networks, direct connections, virtual connections, private networks, virtual private networks, an intra- or inter-process communication channel, some combination of the above, and the like.

The host 205 is a component that hosts the runtime environment. The host 205 may include a computer upon which software is installed, a virtual machine, or some other device.

The runtime environment 210 may be a dynamic language runtime environment or a non-dynamic language runtime environment. The runtime environment 210 may include a Web browser or one or more other components that allow code to be executed outside of a Web browser. The runtime environment 210 may execute code of a program and maintain program state (e.g., stack frames, values of variables, other data, and the like). In executing the code, the runtime environment 210 may execute a statement that indicates information regarding whether notification is to be sent to the development tool 215 if exceptions are encountered while the code is executing.

In executing the statement, the runtime environment 210 may set the property of the runtime object 221. A property is data that may be referenced via the runtime object 221. A property may be associated with a scope that indicates when the property is valid. The runtime object 221 may include one or more properties. Through its properties, the runtime object 221 may encode information that may be used to govern the behavior of the runtime environment 210. For example, a property may indicate whether the development tool 215 is to be notified if an exception occurs within the scope of the statement.

When the runtime environment 210 encounters an exception, the runtime environment 210 may use the exception manager 220 to determine whether the development tool 215 is to be notified of the exception.

The exception manager 220 may operate to evaluate program state that existed in the runtime environment when the exception was encountered. For example, the exception manager 220 may determine what runtime object property applies to the location of the exception and may search for an exception handler that can handle the exception. The exception manager may determine whether to send notification to the development tool 215 based on the program state 222 and the property. The program state 222 may include multiple stack frames where the stack frames are potentially associated with different objects having properties that indicate whether notification is to be sent to the development tool 215. For example, a top stack frame may be associated with a scope in which notification is to be sent while a lower stack frame may be associated with a scope in which notification is not to be sent. One exemplary algorithm for determining whether to notify a debugger of an exception was described previously.

The development tool 215 may access configuration data to determine whether to act on a received notification. For example, a debugger may be configured to ignore exceptions handled in user code. In this case, the debugger may ignore a notification that indicates an exception that has been handled in user code. As another example, a debugger may be configured to break on each exception thrown, regardless of whether the exception will be handled or not. In this case, the debugger may present data regarding the exception on a graphical interface such as a display. As another example, a debugger may be configured to behave in a certain way (e.g., break, do not break, or take other actions), and ignore/override certain types or even all types of statements that are in the code that are intended to influence debugger behavior.

Although some of the discussion above has focused on determining to notify a debugger based on where the exception was handled, the teachings herein may also be applied to determining whether to notify the debugger based on where the exception was raised or where the exception was raised and where it will be handled. For example, a developer may want a debugger to be notified of an exception that is raised in user code and that will be handled in library code. As another example, a developer may not want a debugger to be notified of an exception raised in library code that will be handled in library code. Based on the teachings herein, this behavior may be encoded in logic that is used to determine when to notify the debugger of an exception.

Figure 3:
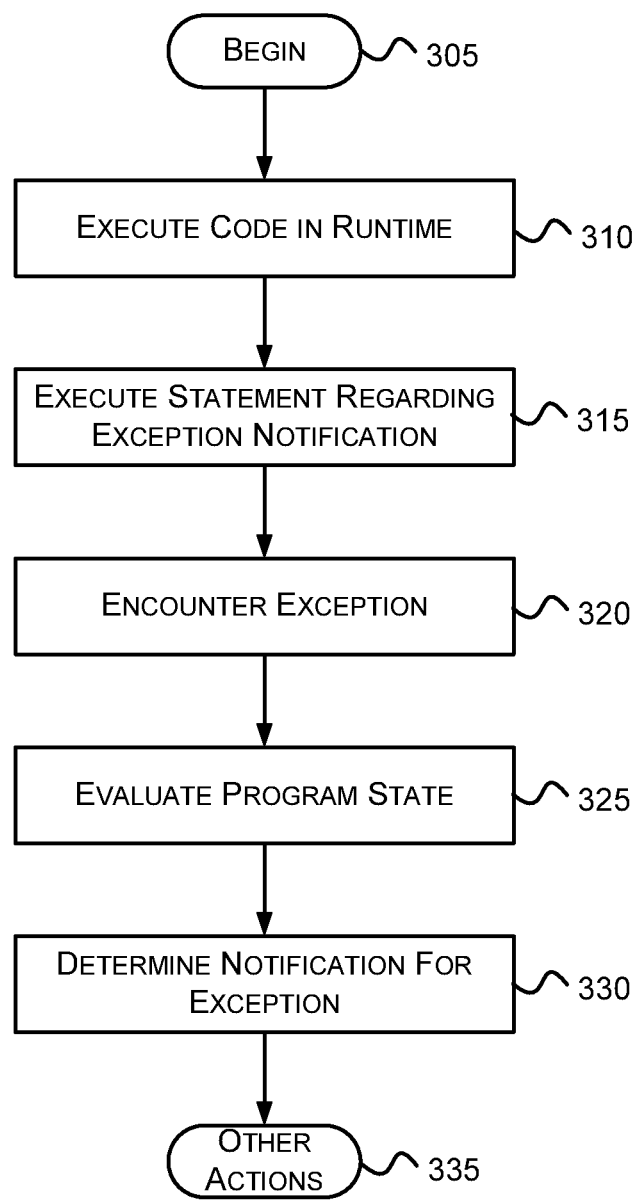
FIG. 3 is a flow diagram that generally represents exemplary actions that may occur in a runtime environment in accordance with aspects of the subject matter described herein.

FIGS. 3-5 are flow diagrams that generally represent exemplary actions that may occur in accordance with aspects of the subject matter described herein. For simplicity of explanation, the methodology described in conjunction with FIGS. 3-5 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 3 is a flow diagram that generally represents exemplary actions that may occur in a runtime environment in accordance with aspects of the subject matter described herein. At block 305, the actions begin.

At block 310, code is executed in a runtime environment. For example, referring to FIG. 2, code of a dynamic language program may be executed in the runtime environment 210.

At block 315, a statement is executed that provides information regarding a notification, if any, to send if an exception occur while the code is executing. For example, referring to FIG. 2, the runtime environment 210 may execute a statement that sets a property of the runtime object 221 to indicate that notification is to be sent to a debugger if exceptions occur while the code is executing. For example, the statement may set a property that indicates that a notification is to be sent to the debugger if an exception is handled in a scope associated with the statement. As another example, the statement may set a property that indicates that a notification is to be sent to the debugger if an exception is handled in the scope of the statement of a scope opened within the scope of the statement. As another example, in response to an exception, a notification may always be sent to the debugger, but based on the notification and configuration data of the debugger, the debugger may determine whether to prominently indicate the exception via the display or some other mechanism.

At block 320, an exception is encountered while executing the code. For example, referring to FIG. 2, the runtime environment 210 may execute a statement that causes an exception to be thrown. For example, the runtime environment 210 may execute a statement that causes a division by zero.

At block 325, program state that existed in the runtime environment when the exception was raised is evaluated. For example, referring to FIG. 2, the exception manager 220 may search stack frames for an appropriate handler to an exception and may determine whether a property of the runtime object 221 applies to a scope that includes the handler.

At block 330, based on the program state and the information regarding notifications, the exception manager 220 may determine a notification to send to the development tool 215 in response to the exception. The notification may include, for example, whether the exception was or would be handled in user code or non-user code or was or would be unhandled.

At block 335, other actions, if any, may be performed.

FIG. 4 is a flow diagram that generally represents exemplary actions that may occur from a development tool's perspective in accordance with aspects of the subject matter described herein. At block 405, the actions begin.

At block 410, a notification of an exception is received. For example, referring to FIG. 2, the development tool 215 may receive notification of an exception that occurred while the runtime environment 210 was executing code.

At block 415, configuration data is accessed to determine whether to present data regarding the exception via a graphical interface. For example, referring to FIG. 1, the debugger 125 may access configuration data in the store 150 to determine whether to display data in response to an exception notification received by the debugger 125. The configuration data may also indicate the prominence with which to display the data based on the type of notification.

At block 420, if data is to be provided to a user, the actions continue at block 425; otherwise, the actions continue at block 430.

At block 425, notification of an exception is provided. For example, referring to FIG. 1, the debugger 125 may, via a graphical interface, display source code that caused an exception to be thrown. The debugger 125 may also display other relevant data regarding the exception. As another example, the debugger 125 may provide notification of an exception by sending a message to the user or by writing an entry to a log file.

At block 430, other actions, if any, may be performed. For example, referring to FIG. 1, the debugger may receive configuration data that indicates whether the debugger is to display data on a graphical interface for exceptions that are handled in user code.

FIG. 5 is a flow diagram that generally represents exemplary actions that may occur when an exception occurs in accordance with aspects of the subject matter described herein. At block 505, the actions begin.

At block 510, an exception is encountered (e.g., is thrown). For example, referring to FIG. 2, the runtime environment 210 encounters an exception while executing code of a program.

At block 515, a determination is made as to whether there is an exception handler for the exception in a top stack frame. If so, the actions continue at block 520; otherwise, the actions continue at block 535.

At block 520, a determination is made as to whether the development tool is set to break execution whenever an exception is encountered. If so, the actions continue at block 525; otherwise, the actions continue at block 530.

In one embodiment, the development tool is notified when an exception is for a top frame and the development tool determines whether to present data corresponding to the exception to a user interface. In another embodiment, the development tool is not notified if configuration data indicates that the development tool is not interested in exceptions that are handled in the top frame.

At block 525, the debugger is notified that an exception has been thrown and that the exception will be handled by code in a top frame. For example, referring to FIG. 2, the development tool 215 is notified that an exception has been encountered and will be handled by user code.

At block 530, other actions, if any, may occur.

At block 535, a search is performed for a frame that has a handler to handle the exception. For example, referring to FIG. 2, the exception manager 220 may search one or more stack frames of the program state 222 to find a handler to handle the exception. This search may proceed in a direction that proceeds from the top stack frame to the bottom stack frame. Furthermore, as mentioned previously, the search may alternatively be performed by consulting a data structure that indicates exception handlers or through other mechanisms without departing from the spirit or scope of aspects of the subject matter described herein.

At block 540, if the frame is found, the actions continue at block 550; otherwise, the actions continue at block 545.

At block 545, the development tool is notified that an exception is unhandled. For example, referring to FIG. 2, the runtime environment 210 may inform the development tool 215 that an encountered exception is not handled by a handler of the program executing within the runtime environment 210.

At block 550, if the code is deduced to be non-user code, the actions continue at block 560; otherwise, the actions continue at block 555.

At block 555, other actions, if any, may be performed.

At block 560, the development tool is notified that an exception will be handled but not by a user code handler. For example, referring to FIG. 2, the runtime environment 210 may inform the development tool 215 that an encountered exception will be handled but not by a user code handler.

At block 565, other actions, if any, may be performed.

Although some of the above has described user and non-user code, the teachings herein may also be applied to N types of code. For example, notification to a development tool may be set for system code, library code, team code, vendor code, and so forth.

Furthermore, although some of the above has described exception handling, the teachings herein may also be applied to other aspects of debugging. For example, the teachings herein may also be applied to stepping through code, variable inspection, source code viewing, and the like.

As can be seen from the foregoing detailed description, aspects have been described related to assisting development tools via code statements. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   during execution of code in a runtime environment, executing a statement of the code, the statement providing information regarding a notification, if any, to send to a debugger if exceptions occur while the code is executing, wherein executing the statement of the code comprises setting a property of a runtime object that is accessible to the runtime environment, wherein the property indicates that the notification is to be sent to the debugger if an exception is or would be handled in a scope associated with the statement, and wherein the property is not inherited across different function calls;
   encountering an exception while executing the code;
   evaluating program state that existed in the runtime environment when the exception was encountered, the evaluating program state comprising searching for an exception handler that will handle the exception,
      if a stack frame that has the exception handler is found during the searching, then determining if the stack frame indicates that a property is set of a debug object, the property accessible to the runtime environment, the property indicating whether the debugger is to be called for exceptions handled by the exception handler, the exceptions potentially occurring outside of a scope having the stack frame; and
   based on the program state and the information, determining the notification, if any, to send to the debugger in response to the exception.

2. The method of claim 1, wherein the property indicates that the notification is to be sent to the debugger if an exception is or would be handled in a scope opened within a scope of the statement.

3. The method of claim 1, wherein evaluating a program state that existed in the runtime environment when the exception was raised comprises determining if there is an exception handler for a top stack frame and determining if configuration data indicates the debugger is to be notified when an exception is thrown.

4. The method of claim 1, further comprising in conjunction with the determining the notification, if any, to send to the debugger in response to the exception, calling a callback function indicated by the statement, the callback function returning data to use in the determining the notification.

5. The method of claim 1, further comprising if the exception handler is not found during the searching, then notifying the debugger that the exception is unhandled and providing the debugger with data regarding the exception.

6. The method of claim 1, further comprising providing the debugger with data that indicates whether the exception was handled in user code or non-user code or was unhandled.

7. The method of claim 1, wherein determining the notification, if any, to send to the debugger in response to the exception comprises determining always to send the notification to the debugger and further comprising determining based on configuration data of the debugger and the notification whether to prominently indicate the exception via a display.

8. The method of claim 1, wherein executing a statement of the code in a runtime environment comprises executing a dynamic language statement in a dynamic language runtime environment.

9. The method of claim 1, wherein executing a statement of the code in a runtime environment comprises executing a non-dynamic language statement in a non-dynamic language runtime environment.

10. A computer system, comprising:
   a processor; and
   a memory coupled to the processor, the memory having program instructions stored thereon that, upon execution by the processor, cause the computer system to implement:

a runtime environment having executable instructions stored in a memory operable to execute code that includes a statement that indicates information regarding whether notification is to be sent to a development tool if exceptions are encountered while the code is executing, wherein executing the code comprises setting a property of a runtime object that is accessible to the runtime environment, the property indicating that the notification is to be sent to the development tool if an exception is or would be handled in a scope associated with the code, and wherein the property is not inherited across different calls;

an object operable to encode the information in a property settable by the statement, the property associated with a scope, the property being accessible by the runtime environment; and an exception manager operable to evaluate program state that existed in the runtime environment when an exception is encountered while executing the code, the exception manager further operable to determine whether to send the notification to the development tool based on the program state and the property, the exception manager evaluating program state by searching for an exception handler that will handle the exception, wherein if a stack frame that has the exception handler is found during the searching, then determining if the stack frame indicates that a property is set of a debug object, the property accessible to the runtime environment, the property indicating whether the debugger is to be called for exceptions handled by the exception handler, the exceptions potentially occurring outside of a scope having the stack frame.

11. The computer system of claim 10, further comprising a debugger operable to communicate with the runtime environment to receive the notification, the debugger further operable to access configuration data to determine whether to present data regarding the exception on a graphical interface.

12. The computer system of claim 10, wherein the runtime is a dynamic language runtime environment and wherein the statement is a dynamic language statement.

13. The computer system of claim 10, wherein the notification indicates whether the exception was or would be handled in user code or non-user code or was or would be unhandled.

14. The computer system of claim 10, wherein the exception manager is operable to search the program state for a handler that handles the exception, the program state having stack frames, the stack frames potentially associated with different objects having properties that indicate whether notification is to be sent to the development tool.

15. A computer storage memory device having computer-executable instructions stored thereon that, upon execution by a computer system, cause the computer system to:

during execution of code in a runtime environment, execute a statement of the code, the statement providing information regarding a notification, if any, to send to a debugger if exceptions occur while the code is executing, wherein executing the statement of the code comprises setting a property of a runtime object that is accessible to the runtime environment, the property indicating that the notification is to be sent to the debugger if an exception is or would be handled in a scope associated with the statement, and wherein the property is not inherited across different function calls;

encounter an exception while executing the code;

evaluate program state that existed in the runtime environment when the exception was encountered, the evaluating program state comprising searching for an exception handler that will handle the exception, if a stack frame that has the exception handler is found during the searching, then determining if the stack frame indicates that a property is set of a debug object, the property accessible to the runtime environment, the property indicating whether the debugger is to be called for exceptions handled by the exception handler, the exceptions potentially occurring outside of a scope having the stack frame; and based on the program state and the information, determine the notification, if any, to send to the debugger in response to the exception.

16. The computer storage device of claim 15, wherein the program instructions, upon execution byt the comptuer system, further cause the computer system to access configuration data to determine whether to present data regarding the exception on a graphical interface and receive, from the graphical interface, input that indicates that a debugger is not to present the data when the exception is handled in user code, the user code part of a dynamic language program, the user code indicated by the statement.

* * * * *